June 26, 1962     SAICHIRO OHASHI     3,040,639
CAMERA APPARATUS
Filed May 13, 1957
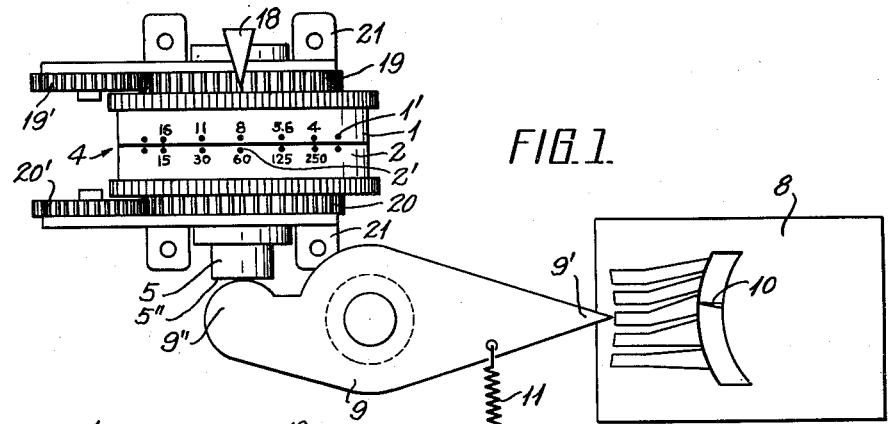
FIG.1.
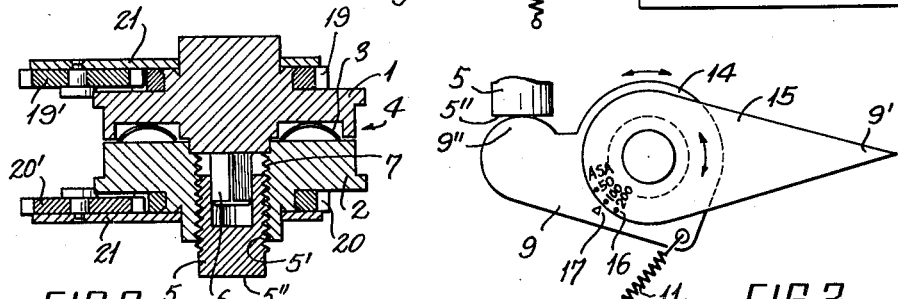 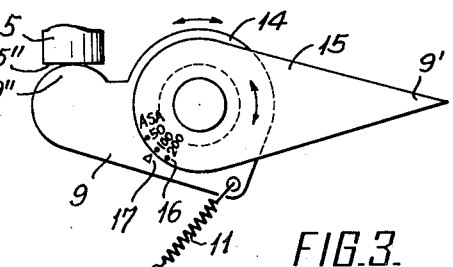
FIG.2.     FIG.3.
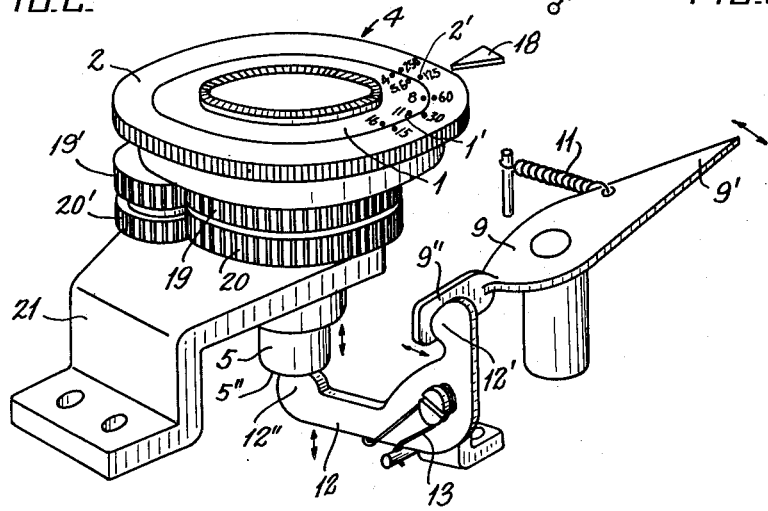
FIG.4.

United States Patent Office 3,040,639
Patented June 26, 1962

3,040,639
CAMERA APPARATUS
Saichiro Ohashi, Kita-ku, Kyoto City, Japan, assignor to Chiyoda Kogaku Seiko Kabushiki Kaisha, Osaka City, Japan, a corporation of Japan
Filed May 13, 1957, Ser. No. 658,757
3 Claims. (Cl. 95—10)

The present invention relates to apparatus for determining exposure conditions required in a photographic camera.

It has heretofore been difficult to connect an exposure meter with the diaphragm portion of a camera in movable contact therewith. Such an exposure meter mechanism and its connections require a large space, because a complicated combination of gear wheels or levers or both is required between the diaphragm and shutter speed dial assembly and the exposure meter assembly. This causes numerous difficulties in the manufacture of the camera and manipulation thereof.

In order to simplify such camera apparatus as that referred to above, the present invention has been developed to provide a device in which a uniformly graduated diaphragm indicator member and a uniformly graduated shutter speed indicator member are related in such a manner that their respective numerical values are arranged in reverse order. Both members are rotatably shiftable, either alone or in combination. Furthermore, both members are provided with a synchronizing indicator member having an actuating element which is advanced or retracted axially as either of the two members is rotated independently, and which is not advanced or retracted axially as the two members rotate together. The diaphragm indicator and the shutter speed indicator are respectively related to the diaphragm fitted on the side of the main camera body and also to the shutter speed controlling mechanism, said actuating member being related to a pointer of the exposure meter through a lever having an index mark, for the purpose of determining adequate conditions for exposure.

As is apparent from the above, the entire mechanism of the said apparatus has been greatly simplified according to the present invention. Thus, the whole mechanism of the moving contact type can be placed in a narrow space, and freedom in design is enhanced and its manipulation is made easy. Also, the combination of diaphragm aperture and shutter speed, giving the same exposure, can always be shown by one indicator member. Readings are extremely easy to take, and the speed and freedom of photographing is advantageously increased.

The present invention will be further described in detail with reference to the accompanying drawings, of which FIG. 1 is a schematic side elevation illustrating an embodiment of the present invention with the synchronizing indicator body arranged in vertical position;

FIG. 2 is a longitudinal mid-section through the synchronizing indicator body shown in FIG. 1;

FIG. 3 is a schematic elevation of the indicator body, as used when a compensation member for the light sensitiveness of the film is provided; and FIG. 4 is a perspective view of the device wherein the synchronizing indicator body is horizontally arranged, with a part thereof removed.

As here shown, a diaphragm indicator body 1, provided with a uniformly graduated diaphragm scale 1' at a suitable place on the main camera body, and a shutter speed indicator body 2 provided with a similar uniformly graduated shutter speed scale 2' are arranged in an opposite sense, that is in such manner that the numerals of the diaphragm scale are arranged in reverse order to those of the shutter speed scale. In this case, both members engage each other, for instance by means of an engaging body 3 which comprises a friction joint provided by a spring washer, so that the two bodies 1 and 2 can either rotate together as one body, or slide freely with respect to one another if desired. They thus constitute an indicator body 4. As illustrated in FIG. 2, an actuating body 5, which performs free axial advancing and retracting movements by slidable displacement of the two bodies 1 or 2, is engaged with a key portion 6 of the diaphragm indicator body 1. A male screw thread 5' is cut around the outer periphery of said actuating body 5 which is screwed in a screw thread of the shutter speed indicator body 2 by means of the screw thread 5' to be inserted in the speed indicator body. As illustrated in FIG. 1, a lever body 9 is interposed between the actuating body 5 and an exposure meter 8 fitted to the main camera body in such a manner that the lever body 9 can perform a free pivotal movement. A pointer needle 9' of the interlocking body 9 is arranged to register with a pointer 10 of an ammeter portion of the exposure meter 8, the tail portion 9'' being urged into contact with the top surface 5'' of the actuating body 5 by means of a spring 11.

The foregoing description relates to the present apparatus wherein the the indicator body 4 is vertical, while in FIG. 4 said synchronizing indicator is arranged horizontally.

In FIG. 4, an auxiliary lever body 12 is provided between the actuating body 5 of the indicator body 4 and the lever body 9, the auxiliary lever body 12 being brought to contact with the top surface 5'' of actuating body 5 at its rear portion 12'' and with the rear portion 9'' of the lever body 9 at its top portion 12', respectively, under the action of a spring 13. As illustrated in FIG. 3, in order to produce a compensation according to the light sensitiveness of the film, on the side of the lever body 9 a rotary member 15 having a pointer needle 9' is journalled rotatably on a stand plate 14 of the lever body 9; a light sensitivity scale 16 can be provided on the rotary member 15, and an index mark 17 can be provided separately on the stand plate 14 respectively. Further, a filter compensation element may also be added to the light sensitivity compensation part. Moreover, an index mark 18 is provided on the main camera body for the diaphragm and speed graduations of the indicator body 4, and simultaneously the diaphragm and shutter speed controlling mechanism on the main camera body as well as the diaphragm body 1 and the shutter speed indicator body 2 are arranged to be interlocked with, for instance, gear wheels 19, 20 and further meshed with gear wheels 19', 20', respectively, and held on the camera body support 21. The indicator bodies 1 and 2 are interlocked with the gear wheels 19 and 20, respectively, by frictional contact therewith. Thus the spring washer 3 illustrated in FIG. 2 urges the indicator bodies 1 and 2 apart and into frictional engagement with the gear wheels 19 and 20, respectively, and these gear wheels normally move with the respective indicator bodies. The diaphragm and shutter of the camera are connected to the diaphragm indicator body 1 and the shutter speed indicator body 2 by gearing in mesh with the gear wheels 19' and 20', in a manner forming no part of the present invention.

In FIG. 1, the pointer 10 and a leading line for the pointer needle 9' are shown above the exposure meter 8, which can, of course, be eliminated, if instead the pointer 10 and the pointer needle are directly brought in moving contact with each other. The pointer 10 and the pointer needle 9' may also be so arranged that the needle 9' lies on the pointer 10, instead of the two members being arranged oppositely as above mentioned. Further, a scale for light sensitivity value indices can be provided at any other suitable position. The said light sensitivity compensation part may be provided on the side of the actuating body 5, instead of being provided on the side of the lever body 9, or the compensation may be performed on the side of the exposure meter as is well known.

The manner in which the mechanism of the present invention operates will now be explained. The diaphragm indicator body 1 and the shutter speed body 2 of the indicator body 4 can be slidingly displaced, as one body or separately, if desired. Now, if the indicator body 1 is moved separately, the actuating body 5 is advanced or retracted by means of the key portion 6, the male screw thread 5' and the screw thread 7 of the shutter speed indicator body 2 which is screwed still on the outside of the actuating body 5; the lever body 9 being in contact with the top surface 5" of the actuating body 5 performs link motion, causing the pointer needle 9' to be displaced with reference to the needle 10. Accordingly, when the needle 9' of the lever body 9 is caused to coincide with the needle 10 of exposure meter 8 by rotating the diaphragm indicator body 1, a particular combination of numerical values of the diaphragm graduation 1' of the displaced diaphragm indicator body 1 and of the shutter speed graduation 2' of the shutter speed indicator body 2 which stands still will appear by itself on the indicator body 4. That is, the combination of respective numerical values of the diaphragm and shutter speed represents an exposure condition which corresponds to the volume of light left by the exposure meter. Any desired combination of numerical values may be caused to coincide with the mark 18 on the side of the main camera body by rotating the indicator body 4. In such case, as the indicator body 4 is rotated as a single body, the actuating body 5 will perform no forward and backward movements. Consequently, the lever body 9 will not operate and the light volume received will not be changed by the above movements.

On the contrary, when the shutter speed indicator body 2 is displaced separately, the exposure condition can be determined by causing the needle 9' of the lever body 9 to follow the indicator needle 10 of the exposure meter 8. Or, particular numerical values of the diaphragm or shutter speed may be set beforehand to coincide with the mark 18; thereupon the needle 9' is caused to follow up the needle 10 by displacing the shutter speed indicator body 2 or the diaphragm body 1 separately respectively to provide the coincidence of the scales, whereby the shutter speed value or the diaphragm value can be operationally obtained corresponding to those already set values. In this case, in order to make adjustment according to the light sensitivity scale, in the case of FIG. 3, the light sensitivity scale 16 can first be set at the mark 17 to regulate the starting position of the needle 9', and further each of the indicator bodies 1, 2 of the indicator body 4 are operationally connected to the diaphragm and shutter speed control mechanism on the side of the main camera body by means of, for instance, gear wheels 19, 20, 19', 20'. In consequence, in addition to the above mentioned adjustments, desirable control operations can also be effected on the side of the control mechanism for diaphragm and shutter speed. On the other hand, in the example of FIG. 4, all the operation is entirely the same as in the case of FIG. 1, except that the auxiliary lever body 12 is added.

What I claim:

1. In camera apparatus for automatically determining exposure conditions in accordance with various combinations of shutter speeds and diaphragm openings, the combination comprising a support, a fixed index mark on said support, a diaphragm-aperture indicator body rotatably mounted on said support and having a diaphragm-aperture scale thereon, a shutter-speed indicator body rotatably mounted on said support and having a shutter-speed scale thereon, said bodies being rotatable about a common axis and being limited to rotary movement, said scales being in juxtaposed relation and disposed for cooperation with said index mark, a lever body pivotally mounted on said support and having a first portion adapted to cooperate with an exposure meter indicator and a second portion adapted to control pivotal movement of said lever body, means defining a centrally disposed threaded bore extending through said shutter-speed indicator body, an externally threaded actuating member disposed in said bore having an interior recess and having an exterior surface in engagement with the second portion of said lever body for pivoting the same, and a key member carried by said diaphragm-aperture indicator body and being slidably but nonrotatably disposed in the interior recess of said actuating member, said key member causing axial displacement of the actuating member when one of said bodies is rotated relative to said index mark whereby said lever body is pivoted to indicate an exposure condition corresponding to aligned readings of said diaphragm-aperture scale and said shutter-speed scale.

2. The combination as recited in claim 1 wherein the first portion of said lever body is adjustable relative to the second portion.

3. The combination as recited in claim 1 wherein an intermediate lever is provided between the exterior surface of said actuating member and the first portion of said lever body, thereby to provide for transmission of the effect of the actuating member into a different plane.

References Cited in the file of this patent

UNITED STATES PATENTS

| 2,209,156 | Fisher | July 23, 1940 |
| 2,252,573 | Leitz et al. | Aug. 12, 1941 |
| 2,849,936 | Fahlenberg | Sept. 2, 1958 |
| 2,887,026 | Rentschler | May 19, 1959 |

FOREIGN PATENTS

| 756,282 | Germany | Feb. 23, 1953 |
| 184,820 | Austria | Feb. 25, 1956 |
| 1,128,476 | France | Aug. 27, 1956 |

OTHER REFERENCES

Kodak, German application K22850, printed December 13, 1956.